Aug. 10, 1965  A. JEPPSSON  3,199,901
MEANS FOR CONNECTING THIN-WALLED PLANE ELEMENTS
Filed Jan. 11, 1963

INVENTOR:
ALLAN JEPPSSON
BY Howson & Howson
ATTYS.

United States Patent Office 3,199,901
Patented Aug. 10, 1965

3,199,901
MEANS FOR CONNECTING THIN-WALLED
PLANE ELEMENTS
Allan Jeppsson, Jarna, Sweden, assignor to Aktiebolaget
Svenska Flaktfabriken, Stockholm, Sweden
Filed Jan. 11, 1963, Ser. No. 250,887
Claims priority, application Sweden, Jan. 15, 1962,
417/62
1 Claim. (Cl. 285—364)

The present invention relates to a means for connecting thin-walled plane elements of sheet metal, plastic or similar material for the production of structural sections, in particular those intended for ventilating plants.

Sections made up of plane elements employed in the above-mentioned application are usually assembled by means of seamed joints of some kind and in certain cases, flanged joints must be used which require welding or riveting. Seamed joints, however, do not meet the requirements usually placed on such parts for air-tightness and structural stability, while flanged joints are heavy and expensive and are not suited for connecting elements that must be fitted at the place of erection, which is most often the case for ventilating ducts, casings, and the like.

The primary purpose of the present invention is to simplify the erection of structural sections and to permit the fabrication of a joint which combines the simplicity and adaptability of the seamed joint with the air-tightness and stability of the flanged joint. A joint constructed in accordance with the present invention consists of two connection strips fixed to the edges of the respective sections being connected and a guide rail which can be slipped over the connection strips. The invention is characterized in that the connection strips are made up of channel form rails which are U-shaped channels, one flange of each rail being bifurcated to accommodate the plane edges of the adjacent sections and the other flanges of which are designed to be gripped by the guide rail. Further the web of each channel rail is provided with a groove to accommodate a sealing cord therebetween.

A practical embodiment of the invention for connecting together plane elements of square or rectangular ducts is characterized in that connection strips and guide rails are made up in lengths corresponding to respective sides of the duct and that the connection strips are joined together and reinforced at each corner by means of outside-mounted corner pieces attached to the strips with legs having a cross section conforming to the exterior of the connection strips and an outmost corner portion with a flat triangular surface flush with the central plane of the joint.

The invention will now be described in greater detail with reference to the accompanying drawing, wherein.

Figure 1:
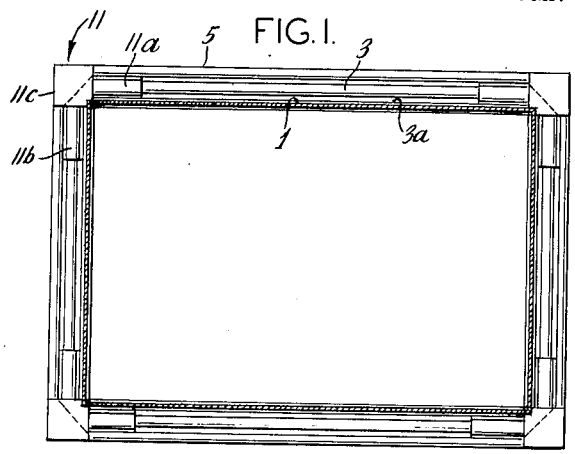
FIG. 1 is a transverse section of a rectangular ventilating duct having joints made in accordance with the invention.
Figure 2:
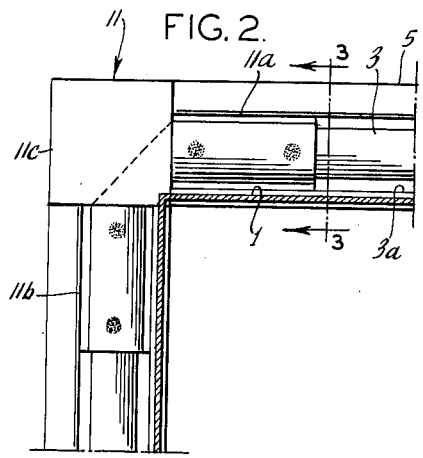
FIG. 2 is a fragmentary enlarged view of the upper left hand corner joint of the ventilating duct illustrated in FIG. 1.
Figure 3:
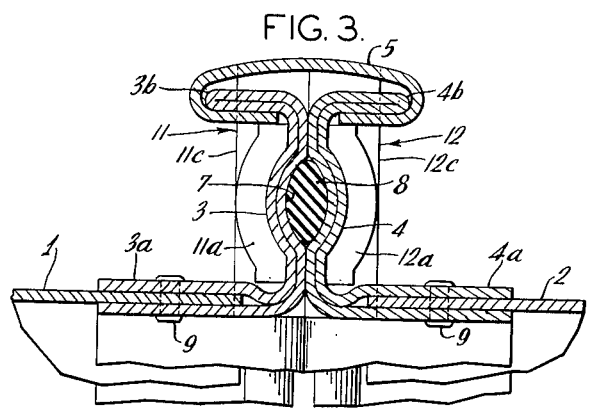
FIG. 3 is a transverse section taken along line 3—3 of FIG. 2.

In the drawing, 1 and 2 designate plane elements connected according to the invention by means of two channel-form connection strips 3 and 4 and a guide rail 5 which is slipped over the strips. The U-shaped connection strips, which in the embodiment shown are constructed of double-folded sheet metal, are provided with a first flange 3a and 4a respectively, which is bifurcated to accommodate the edge of the plane element, while the second flange 3b and 4b is enclosed by the guide rail. A groove 7 is defined between the webs of the connection strip to accommodate a sealing chord 8 of rubber or other elastic material between the strips. In order to locate the connection strips along the edges of the plane elements and to secure the elements, the strips are fastened to the edges of the elements by means of tubular blind rivets 9. Of course other means of locating the strips may be employed, such as tack welding.

Figure 5:
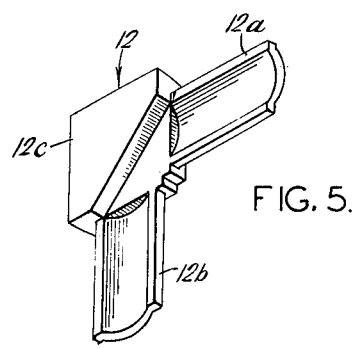
FIG. 5 is a fragmentary perspective view of a portion of the corner joint illustrated in FIG. 4.
Figure 4:
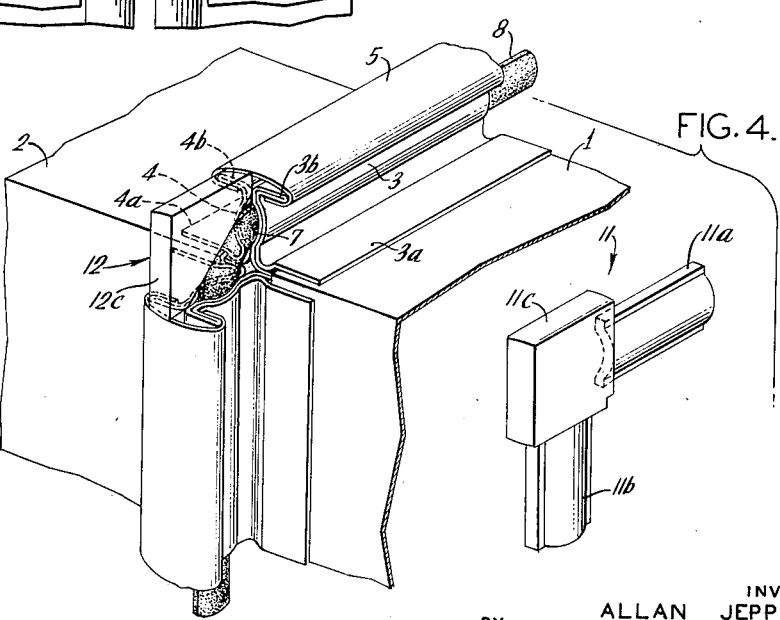
FIG. 4 is a fragmentary enlarged perspective view of the joint shown in FIG. 2.

In FIG. 1, a rectangular ventilating duct is illustrated having a transverse joint made in accordance with the invention. Connection strips 3 and 4 and guide rails 5 are cut in this case to lengths corresponding to the respective sides of the duct and are joined together and reinforced at each corner by means of externally mounted corner pieces 11 and 12 fitted outside the strips and attached to the strips by welding or by other means. the legs 11a, 11b, 12a and 12b the design of which is shown more in detail in FIGS. 4 and 5, corresponding to the corner pieces 11 and 12 respectively are made with a cross section suited to the web of the connection strips. In order to obtain the necessary sealing at the corners, the corner pieces are respectively made with a triangular corner part 11c and 12c with a flat surface coinciding with the central plane of the joint.

What I claim is:

Apparatus for sealingly connecting aligned, adjacent, terminal ends of polygonal ducts: said apparatus comprising complementary assemblies surrounding said terminal ends of said ducts; each assembly comprising a U-shaped channel for each plane portion and coextensive therewith, and a corner member for each corner portion of said duct; said corner members connected to said U-shaped channel members thereby rendering said assemblies continuous about said terminal ends; each of said U-shaped channels having a web and first and second spaced flanges projecting from the same side of said web, each channel being adapted for mating relation with its complement, web-to-web; the first flange of each channel being bifurcated to accommodate therebetween plane portions of the adjacent duct; a guide rail having inturned facing flanges to overlap, underlie, and thereby grip each of the second flanges when said channels are in mating relation thereby uniting said complementary assemblies; each of said webs having a central convex portion defining a groove between the webs when they mate, and a sealing cord in said groove circumscribing said terminal ends of said ducts; each corner member comprising an upstanding body portion and projecting legs, each of said legs having a convex cross section engaging and overlying the web of said channels, and connected thereto to provide said continuous connection; said body portion having an offset portion forming with its complement a passage in registry with and connecting the grooves of adjoining channels, said offset portion being positioned and dimensioned to squeeze said cord against said corner portion to seal said corner.

References Cited by the Examiner
UNITED STATES PATENTS

| 565,499 | 8/96 | Patterson | 285—424 |
|---|---|---|---|
| 1,416,334 | 5/22 | Connery | 285—424 |
| 1,450,826 | 4/23 | Walten | 285—424 |
| 1,740,237 | 12/29 | Greenwood et al. | 220—80 |
| 2,916,054 | 12/59 | Callan | 285—424 |
| 3,010,548 | 11/61 | Canalini. | |

FOREIGN PATENTS

| 243,931 | 5/60 | Australia. |
|---|---|---|
| 819,024 | 10/51 | Germany. |
| 877,974 | 9/61 | Great Britain. |

CARL W. TOMLIN, *Primary Examiner.*